United States Patent [19]

Schofield

[11] Patent Number: 5,860,072
[45] Date of Patent: Jan. 12, 1999

[54] METHOD AND APPARATUS FOR TRANSPORTING INTERFACE DEFINITION LANGUAGE-DEFINED DATA STRUCTURES BETWEEN HETEROGENEOUS SYSTEMS

[75] Inventor: Andrew Schofield, Cham, Switzerland

[73] Assignee: Tandem Computers Incorporated, Cupertino, Calif.

[21] Appl. No.: 680,203

[22] Filed: Jul. 11, 1996

[51] Int. Cl.[6] .................................................. G06F 17/30
[52] U.S. Cl. ...................... 707/101; 395/683; 395/185.1; 345/335
[58] Field of Search ................................ 704/8; 345/335; 395/200.33, 553, 182.11, 701, 682, 683, 185.1; 379/100.07

[56] References Cited

U.S. PATENT DOCUMENTS

| | | | |
|---|---|---|---|
| 3,886,522 | 5/1975 | Barton et al. | 340/146.1 |
| 4,941,170 | 7/1990 | Herbst | 379/100.07 |
| 5,457,797 | 10/1995 | Butterworth et al. | 395/682 |
| 5,613,148 | 3/1997 | Bezviner et al. | 395/200.33 |
| 5,621,885 | 4/1997 | Del Vigna, Jr. | 395/182.11 |
| 5,627,979 | 5/1997 | Chang et al. | 395/335 |
| 5,642,511 | 6/1997 | Chow et al. | 395/701 |
| 5,664,206 | 9/1997 | Murow et al. | 704/8 |
| 5,689,689 | 11/1997 | Meyers et al. | 395/553 |
| 5,724,503 | 3/1998 | Kleinman et al. | 395/185.1 |
| 5,732,270 | 3/1998 | Foody | 395/683 |

FOREIGN PATENT DOCUMENTS

0 381 645 A   8/1990   European Pat. Off. .

OTHER PUBLICATIONS

Ross, Michael "Portability by Design", Dr. Dobb's Journal, v19, n3, p. 40(6), Mar. 1994.

Box, Don "Q&A: ActivX/COM.", Microsoft Systems Journal, v11, n11, p. 91(7), Nov. 1996.

Jacquemot et al. "COOL: The Chorus Corba Compliant Framework", Compcon Spring '94 IEEE Computer Society Int'l Conf., pp. 132–141, 1994.

Vogel et al. "Understanding and IDL Lesson one: DCE and Corba", Services in Distributed & Networked Environments, 1996 3rd Int'l Workshop, pp. 114–121, 1996.

North, Ken "Understanding OLE: Microsoft's Language–independent, binary Standard for Object Sharing on Desktops and Across Networks", DBMS, v8, n7, p. 50(7), Jun. 1995.

Pompeii, John "Distributed Objects an the Internet", Dr. Dobbs's Journal on CD–ROM, v21, n3, pp. 1–9, Mar. 1996.

Article by Neufeld et al., "An Overview of ASN.1" Computer Networks and ISDN Systems, vol. 23, No. 5, 1 Feb. 1992, pp. 393–415, XP000249379.

Article by Chappell D: "A Tutorial on Abstract Syntax Notation One (ASN.1)" Open Systems Data Transfer, vol. 25, 1 Dec. 1986, pp. 1–13, XP000564222.

*Primary Examiner*—Paul R. Lintz
*Assistant Examiner*—Charles L. Rones
*Attorney, Agent, or Firm*—Graham & James LLP

[57] ABSTRACT

A method and apparatus for transporting IDL-defined data structures to and from a format convenient for transport between two computers are disclosed. The data structures is originally described in a string. The string description is converted to a different format containing additional information about the alignment and size of the data structure. An application in the sending computer removes the alignment from the data structure and stores the data structure in a buffer. The data structure is stored in the output buffer in a predetermined format that is based upon the type of the data structure. The buffer is then transmitted to a data file or to the memory of the receiving computer. The receiving computer extracts the data structure from the buffer based upon the predetermined format. The data structure is realigned and stored in the memory of the second computer.

30 Claims, 7 Drawing Sheets

METHOD AND APPARATUS FOR TRANSPORTING INTERFACE DEFINITION LANGUAGE-DEFINED DATA STRUCTURES BETWEEN HETEROGENEOUS SYSTEMS

BACKGROUND OF THE INVENTION

Related Application

The following related U.S. applications are hereby incorporated by reference: U.S. application Ser. No. 08/680,270 entitled "Method and Apparatus for Describing an Interface Definition Language-Defined Interface, Operation, and Data Type" by A. Schofield, filed Jul. 11, 1996; U.S. application Ser. No. 08/678,681 entitled "Method and Apparatus Using Parameterized Vectors For Converting Interface Definition Language-Defined Data Structures into a Transport and Platform Independent Format" by A. Schofield, filed Jul. 11, 1996; U.S. application Ser. No. 08/678,298 entitled "Data Structure Representing An Interface Definition Language Source File" by A. Schofield, filed Jul. 11, 1996; U.S. application Ser. No. 08/678,295 entitled "Method and Apparatus for Performing Distributed Object Calls" by A. Schofield filed Jul. 11, 1996; U.S. application Ser. No. 08/680,202 entitled "Method and Apparatus for Asynchronously Calling and Implementing Objects" by A. Schofield, filed Jul. 11, 1996; U.S. application Ser. No. 08/680,266 entitled "Method and Apparatus for Performing Distributed Object Calls using Proxies and Memory Allocation" by A. Schofield filed Jul. 11, 1996.

1. Field of the Invention

The present invention relates to a method and apparatus for transporting data structures described in the Object Management Group's Interface Definition Language between heterogeneous platforms. More particularly, the present invention utilizes functions for removing the alignment from data structures and storing the data structures in a predetermined format for transport to a file or across heterogeneous platforms.

2. Background

Distributed object computing combines the concepts of distributed computing and object-oriented computing. Distributed computing consists of two or more pieces of software sharing information with each other. These two pieces of software could be running on the same computer or on different computers connected to a common network. Most distributed computing is based on a client/server mode. With the client/server model, two major types of software are utilized: client software, which requests the information or service, and server software, which provides the information or service.

Object-oriented computing is based upon the object model where pieces of code called "objects"—often abstracted from real objects in the real world—own data (called "attributes" in object-oriented programming parlance) and provide services through methods (also known as "operations" or "member functions"). The data and methods contained in an object may be "public" or "private." Public data may be altered by any other object. Most data, however, is private and accessible only to methods owned by the object. Typically, the methods operate on the private data contained in the object.

A collection of similar objects make up an interface (or "class" in C++ parlance). An interface specifies the methods and types of data contained in all objects of the interface. Objects are then created ("instantiated") based upon that interface. Each object contains data specific to that object.

Each specific object is identified within a distributed object system by a unique identifier called an object reference.

In a distributed object system, a client sends a request (or "object call") containing an indication of the operation for the server to perform, the object reference, and a mechanism to return "exception information" (unexpected occurrences) about the success or failure of a request. The server receives the request and, if possible, carries out the request and returns the appropriate exception information. An object request broker ("ORB") provides a communication hub for all objects in the system passing the request to the server and returning the reply to the client.

On the client side, the ORB handles requests for the invocation of a method and the related selection of servers and methods. When an application sends a request to the ORB for a method to be performed on an object, the ORB validates the arguments contained in the request against the interface and dispatches the request to the server, starting it if necessary. On the server side, the ORB receives such requests, unmarshals the arguments, sets up the context state as needed, invokes the method dispatcher, marshals the output arguments, and returns the results to the client, thereby completing the object invocation.

Both client and server must have information about the available objects and methods that can be performed. Through the hiding of private data ("encapsulation" in object-oriented parlance), the client does not need to know how the request will be carried out by the server. Nevertheless, both client and server must have access to common interface definitions to enable communication therebetween. Currently, the standard language for distributed object computing is the Object Management Group's ("OMG") Interface Definition Language ("IDL").

A distributed object system developer defines the system's available interfaces in IDL. An interface includes one or more operations that can be performed on objects of that interface. Each operation may receive one or more parameters. Each parameter is of a particular IDL data type.

IDL includes several data types. Integers are represented through long and short, signed and unsigned integer data types. OMG IDL floating point types are float and double. The float type represents IEEE single-precision floating point numbers while the double type represents the IEEE double-precision floating point numbers. OMG IDL defines a char data type consisting of 8-bit quantities. The boolean data type is used to represent true/false values. The "any" type permits the specification of values that can express any OMG IDL type. Complex types, such as structures, unions, and templates are also represented.

IDL is designed to be used in distributed object systems implementing OMG's Common Object Request Broker Architecture ("CORBA"). In a typical CORBA system, interface definitions are written in an IDL-defined source file (also known as a "translation unit"). The source file is compiled by an IDL compiler that maps the source file to a specific programming language. The IDL compiler generates programming-language-specific files, including client stub files, header files, and server skeleton files. Client stub files are then compiled and linked into client applications and are used to make requests. Header files are linked into client and server applications and are used to define data types. Server skeleton files are linked into server applications and are used to map client operations on objects (requests) to methods in a server implementation.

When object calls are made, data structures are transported from one computer system to another (client-toserver and server-to-client). Such object calls may occur between identical systems, but are likely to be made across heterogeneous platforms using different operating systems, programming languages, and compilers. Once IDL source files have been compiled and mapped to a particular programming language, each independent compiler vendor will align data structures on the stack in a particular manner. Accordingly, both the client and the server systems may align data structures differently. Moreover, both the client systems may align parameters within a structure differently. If the client and server application do not understand each other's method of alignment, the transported data structure will become garbled and an error will occur.

In addition, the hardware utilized by the client and server may be different. For example, one computer may include a CPU that requires so-called "BIGendian" integer representation where the most significant byte is listed first. The other computer may include a CPU that requires "LITTLEendian" representation where the least significant byte is listed first. Data structures cannot be passed effectively between these two machines without reciprocal knowledge of each system.

Moreover, if clients and servers are required to have detailed knowledge of each other, a primary goal of object-oriented computing—encapsulation—is lost. Both the client and the server applications must write detailed alignment functions to ensure compatibility during object calls. This extra coding work makes distributed object computing inefficient.

Accordingly, there is a need for a method for converting IDL-defined data structures into a platform-independent format, such that converted data types can be transported effectively across heterogeneous systems.

In addition, there is a need for a method that reduces the amount of code and execution time required by client and server applications to implement object calls.

SUMMARY OF THE INVENTION

The present invention is directed to a method that satisfies the need to convert IDL-defined data structures into a platform-independent format, such that converted data structures can be transported across a network. The need for reducing the amount of code and execution time required by client and server applications is also satisfied. Specifically, both systems have a description of a data structure defined in ASCII string format called the Compact IDL Notation ("CIN"). The CIN is converted to a "prepared CIN" format containing additional information about the offset and size of the data structure. The prepared CIN is used to extract data structure and store the data into an output buffer based upon the size and offset of the data structure. The data is densely packed into the output buffer without any alignment padding fields. The output buffer is transferred to an input buffer of the second system. The second computer extracts the data from its input buffer. The data is then converted to the format of the second system and realigned in a data structure based upon the prepared CIN.

The method is performed through the use of calls to implementation libraries made by the client and server systems. The Implementation Libraries include generic functions located in a run-time library. By calling generic functions, the client and server applications can easily make object calls without specific knowledge of each other and without requiring additional code.

A more complete understanding of the conversion method will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

I. Hardware Overview

Reference will now be made in detail to the preferred embodiments of the invention, examples of which are illustrated in the accompanying drawings. Wherever possible, the same reference numbers will be used throughout the drawings to refer to the same or like parts.

Figure 1:
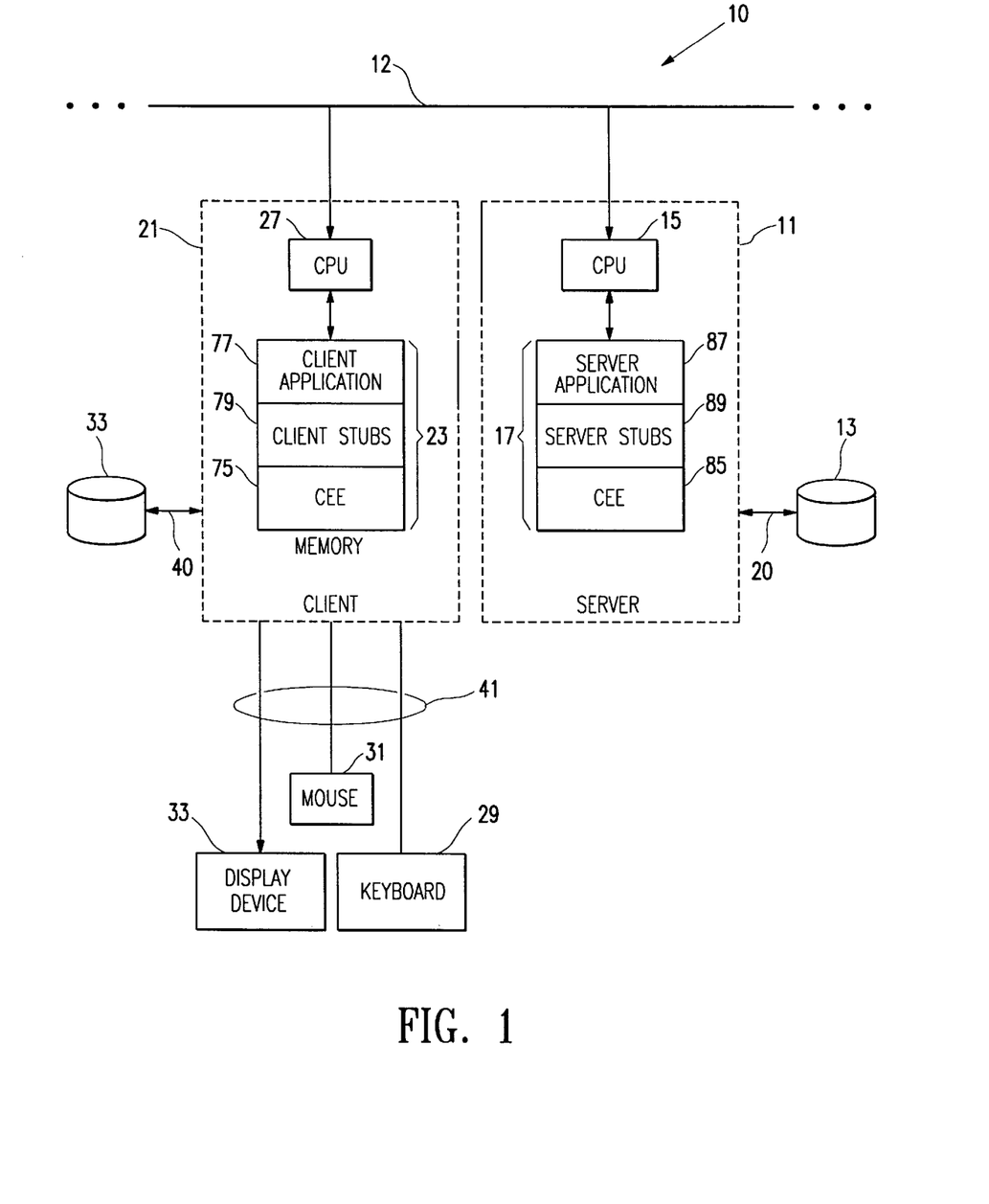
FIG. 1 is a diagram of a distributed computing environment using the method or apparatus of the present invention.

As illustrated in FIG. 1, the method of the present invention is designed for use in a distributed (client/server) computing environment 10. The client and server systems are connected by network connections 12, such as internet connections or the connections of a local area network. The server computer 11 communicates over a bus of I/O channel 20 with an associated storage subsystem 13. The server system 11 includes a CPU 15 and a memory 17 for storing current state information about program execution. A portion of the memory 17 is dedicated to storing the states and variables associated with each function of the program which is currently executing on the client computer. The client computer 21 similarly includes a CPU 27 and associated memory 23, and an input device 29, such as a keyboard or a mouse and a display device 33, such as a video display terminal ("VDT"). The client CPU communicates over a bus or I/O channel 40 with a disk storage subsystem 33 and via I/O channel 41 with the keyboard 29, VDT 33 and mouse 31. Both computers are capable of reading various types of media, including floppy disks and CD-ROMs.

The client/server model as shown in FIG. 1 is merely demonstrative of a typical client/server system. Within the context of the present invention, the "client" is an application that requests services while the "server" is an application that implements the requested service. Indeed, both the client and server application may reside on the same computer and within a common capsule, as discussed below. The client and server application may also reside on separate computers using different operating systems.

II. Distributed Computing Environment

The method and apparatus of the present invention may be utilized within any distributed computing environment.

In a preferred embodiment, the Common Execution Environment ("CEE"), which is a component of the TANDEM Message Switching Facility ("MSF") Architecture is utilized. The CEE activates and deactivates objects and is used to pass messages between client and server applications loaded in CEE capsules. The CEE may be stored in the memory of a single machine. The CEE and client and server applications may, however, be loaded on multiple machines across a network as shown in FIG. 1. The client-side CEE 75 is stored in the client memory 27. The server-side CEE 80 is stored in server memory 17.

Figure 2A:
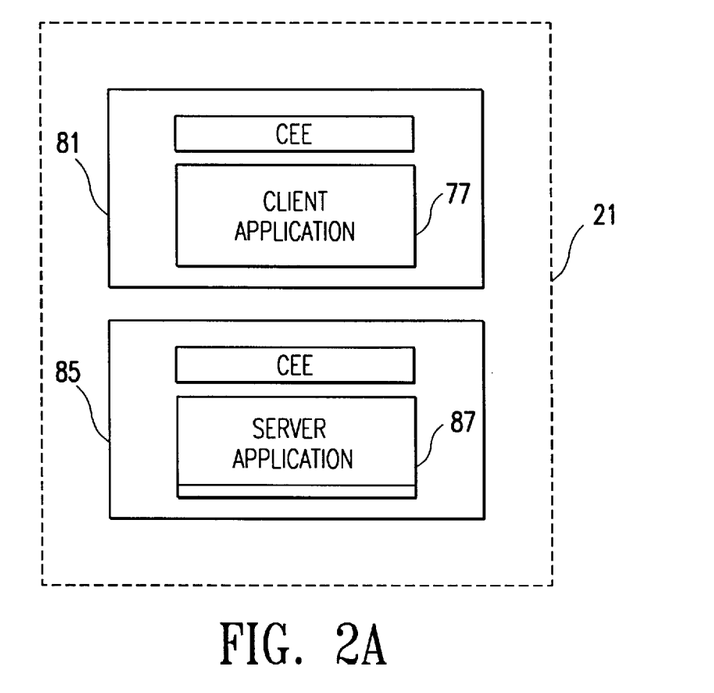
FIGS. 2A & 2B is a diagram of the Common Execution Environment infrastructure.
Figure 2B:
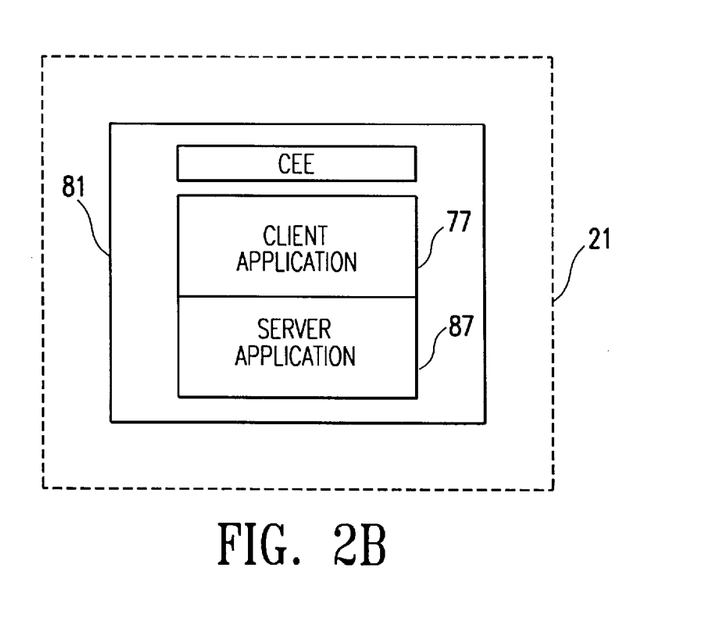

The CEE uses a "capsule" infrastructure. A capsule encapsulates memory space and execution stream. A capsule may be implemented differently on different systems depending upon the operating system. For instance, on certain systems, a capsule may be implemented as a process. On other systems, the capsule may be implemented as a thread. Moreover, client and server applications may be configured within different capsules contained on different machines as shown in FIG. 1. Alternatively, the different capsules may be configured as shown in FIG. 2. FIG. 2a shows a client application 77 loaded in a single capsule 81 and a server application 87 may be loaded in a separate capsule 85. Both capsules, however, are stored on the same machine 21. Both the client and server applications may also be loaded within a single capsule 81 on the same machine 21 as shown in FIG. 2b. As stated above, the method of the present invention will be described with reference to the multiple capsule, multiple machine case. Accordingly, the client 12 and server machine 11 include a client-side CEE 75 and a server-side CEE 85 loaded in their respective memories.

Figure 3:
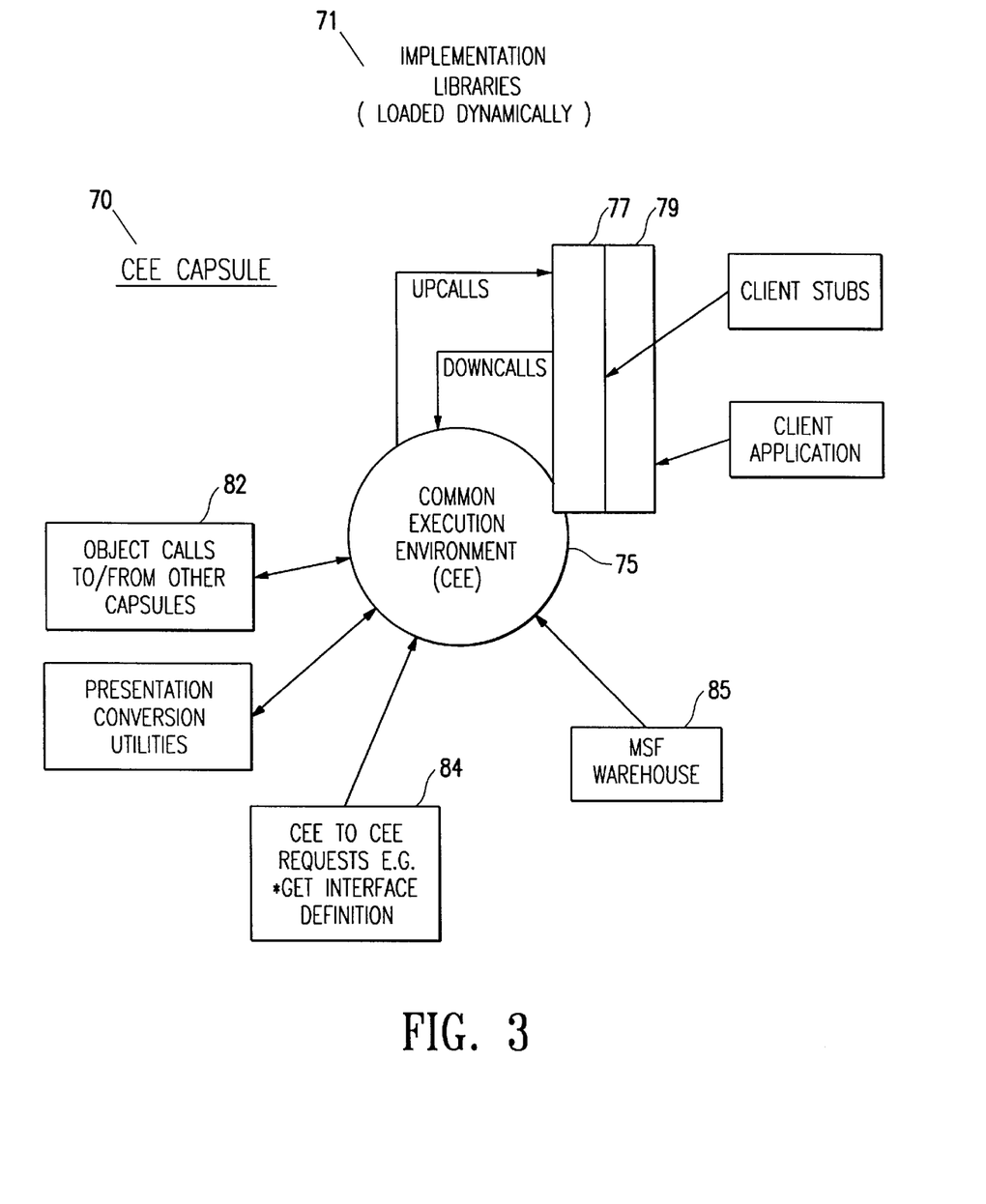
FIG. 3 is a diagram of conventional IDL source file compilation and linking.

FIG. 3 shows a CEE capsule 70 contained, for example, in a client computer memory 27 (not shown) that includes the CEE 75 and certain of the core CEE components and implementations of objects contained within Implementation Libraries 71. The Implementation Libraries 71 include the client application 79 (or the server application in the case of the server capsule) and client stubs 77 (or server stubs) generated from the IDL specification of the object's interface, as described below. The Implementation Libraries 71 and the CEE 75 interact through the down-calling of dynamically-accessible routines supplied by the CEE and the up-calling of routines contained in the Implementation Library. The CEE 75 can also receive object calls 82 from other capsules within the same machine and requests 84 from other CEE's. The client-side CEE 75 and the server-side CEE 85 may communicate using any known networking protocol. The client and server CEE's includes numerous libraries of routines that can be down-called from client and server applications. The Presentation Conversion Utilities ("PCU") 89 is a library of routines utilized in the method of the present invention.

Objects implemented in a CEE capsule may be configured or dynamic. Configured objects have their implementation details stored in a repository (such as the MSF Warehouse 85) or in initialization scripts. Given a request for a specific object reference, the CEE 75 starts the appropriate capsule based on this configuration data. The capsule uses the configuration data to determine which implementation library to load and which object initialization routine to call. The object initialization routine then creates the object. Dynamic objects are created and destroyed dynamically within the same capsule. Dynamic objects lack repository-stored or scripted configuration information.

The following paragraphs describe a system-level view of how the Implementation Libraries interact with the CEE 75. The CEE 75 implements requests to activate and deactivate objects within a capsule. In addition, the CEE facilitates inter-capsule object calls 82 as well as requests from other CEE's 84, as discussed above. Object activation requests arise when an object call from a client or server application must be satisfied. To activate an object, the CEE 75 loads the appropriate Implementation Library (if not already loaded) containing the object's methods and then calls a configured object initialization routine. The initialization routine specifies which interface the Implementation Libraries support and registers the entry points of the object's methods to be called by the CEE at a later time.

When the client and server systems start, both the client-side and server-side CEE's run their own initialization. This initialization tells client and server CEE's where to locate the various Implementation Libraries. Once located by the CEE, the initialization routines in the client and server applications are called. The initialization routines contained in the client and server applications must first carry out any required application-specific initialization. Next, both the client and server initialization routines call a stub function which, in turn, down-calls a CEE function (contained in a dynamic library as stated above) called CEE_INTERFACE_CREATE to specify the object's interface. An interface may be specified for each object. The interface description is normally generated from an IDL description of the interface, as discussed below. CEE_INTERFACE_CREATE creates an interface and returns an "interface handle" to the newly created interface. The handle is a unique identifier that specifies the interface. The server application initialization routine then uses the interface handle to down-call CEE_IMPLEMENTATION_CREATE. CEE_IMPLEMENTATION_CREATE creates an implementation description that can be used by one or more objects. CEE_IMPLEMENTATION_CREATE returns an "implementation handle" that is a unique identifier specifying the implementation for each operation in the interface. Finally, the server application initialization routine uses the implementation handle to call a stub function which down-calls CEE_SET_METHOD. CEE_SET_METHOD specifies the actual addresses of specific method routines of the implementation as contained in the server application. The CEE then has sufficient information to connect object calls in the client application to specific methods in the server application.

III. Compiling and Linking IDL Source Files

Figure 4:
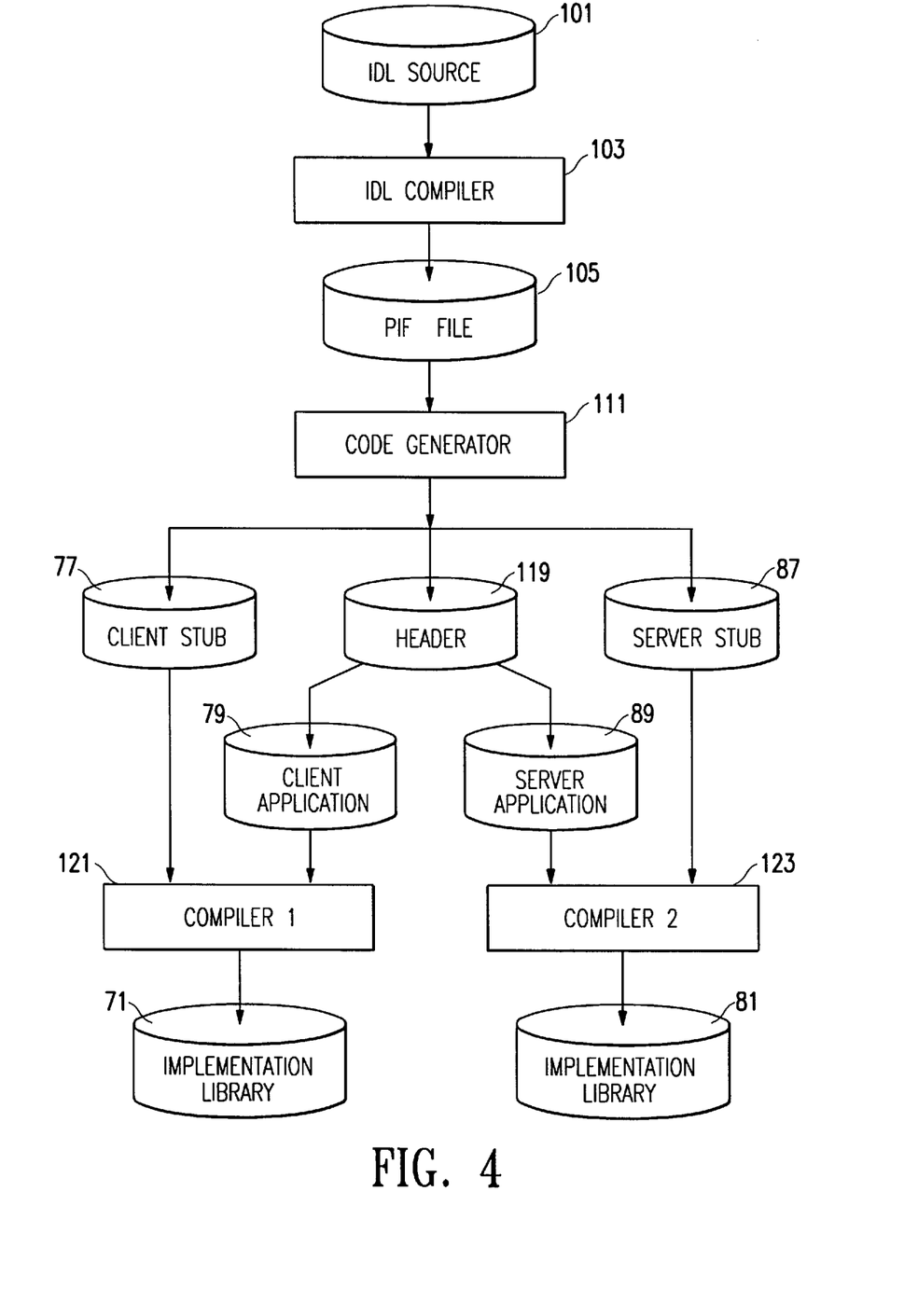
FIG. 4 is a diagram of IDL source file compilation and linking utilizing the method of the present invention.

FIG. 4 shows how IDL source files are compiled and linked into client and server applications that will utilize the method and apparatus of the present invention. First, an IDL source file 101 is prepared containing IDL interface definitions. An IDL compiler 103 compiles the source file 101. The IDL compiler 103 parses the code 101 to produce an intermediate Pickled IDL file ("PIF") file 105 for storage of the original source file. A code generator 111 then parses the PIF file. The generation of a PIF file is described in U.S. application Ser. No. 08/678,298 entitled "Data Structure Representing An Interface Definition Language Source File" by A. Schofield, filed Jul. 11, 1996. Preferably, the IDL compiler and code generator are combined to generate code. The code generator 111 generates files in the language of the client and server applications. If the client and server applications are in different languages, different code generators are used. Alternatively, the code generator 111 and IDL compiler 103 may be combined in a single application to produce language-specific code. The code generator 111 produces a client stub file 77 containing client stub functions and a server stub file 87 containing definitions for object implementations. The client stub file 77 and the server stub file 87 are compiled by programming language-specific compilers 121, 123 to produce compiled client stub object code and compiled server stub object code. Similarly, a client application 79 and a server application 89 are compiled by programming-language-specific compilers to produce compiled client application object code and compiled server application object code. The client application 79 and the server application 89 also include a header file 119 generated by the code generator 111. The header file 119 contains common definitions and declarations. Finally, a language compiler 121 links the client application object code and the client stub object code to produce an implementation library 71. Similarly, a second language compiler 123 links the server application object code server stub object code to produce another implementation library 81.

In addition, the header file 119, the client stub file 115, and the server stub file 117 include a compact version of each IDL-defined data structure termed Compact IDL Notation ("CIN"). CIN is an ASCII (or other character-based) representation of an IDL data structure utilizing a special notation. The CIN descriptor is contained in the header file 119 which is included by both the client application 123 and the server application 123. The descriptor is also contained in the client and server stub files as well. Since both the client and server applications 121, 123 have access to the CIN, the generic functionality provided by the PCU library 130 can be used by heterogeneous communicants. The creation of CIN by the code generator is described in detail in U.S. application Ser. No. 08/680,270 entitled "Method and Apparatus for Describing an Interface Definition Language-Defined Interface, Operation, and Data Type" by A. Schofield, filed Jul. 11, 1996.

IV. Transporting Data Structures

Now, the method of the present invention will be described. The method and apparatus of the present invention is implemented by using a group of generic functions or routines 130 that are available to the client and server applications at run-time. These routines are intended to be used in conjunction with data structures originally described in IDL. The principal routines are PCU_PREPARE, PCU_PACK, and PCU_UNPACK.

An IDL source file may contain numerous type definitions for various data structures. When the source file is compiled and linked into client and server applications, the data structures are used by the client and server applications to perform object calls. A client application may request that an operation be performed on an object using data contained in a particular data structure. The data included in this data structure will be transported to the server application during the object call. The server application must align the data within the data structure properly in order to effectively implement the operation on an object.

Figure 5A:
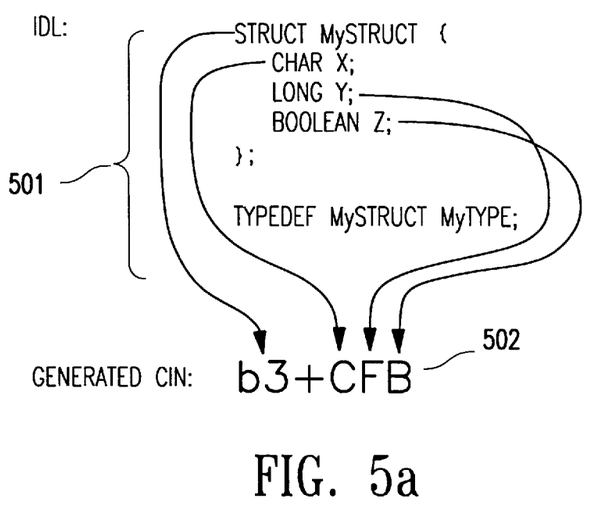
FIGS. 5(a) and 5(b) show an IDL-defined data structure, generated CIN description, and generated array of op_tag structures.

The method of the present invention facilitates the transporting of IDL-defined data structures across heterogeneous systems. FIG. 5a shows a sample data structure 501 written in IDL. The structure, MyStruct, as written in IDL, includes three components: a char data type component, a long data type component, and a boolean data type component. This type definition is contained in an IDL source file 101, for example, along with interface definitions.

A code generator parses the IDL source file and produces a header file containing a CIN description 502. The CIN descriptor contains a series of ASCII characters that succinctly describes the structure without using identifiers (such as the name of the structure). In this example, the b3 characters identify the data structure as an IDL struct type containing three elements. The C indicates an IDL char type. The F character identifies an IDL long type and the B character identifies a boolean data type.

PCU_PREPARE converts the CIN description of a data type into a "prepared CIN" form which is more convenient to use at run-time than the CIN description. Prior to utilizing the routines PCU_PACK and PCU_UNPACK, the CIN description of each data structure contained in the header file 119, as generated by the code generator 111, must be "prepared". PCU_PREPARE is called once by both the client and the server. Since the call is a relatively expensive one, a single call to PCU_PREPARE during initialization saves valuable system resources. The call is preferably made during an initialization routine of the client and server application. PCU_PREPARE is defined in C as follows:

```
PCU_PREPARE (
    const char      *cinbuf
    long            cinlen,
    long            prepbufmaxlen,
    void            *prepbuf,
    long            *prepbuf_len,
    long            *cin_used);
```

In this function, cinbuf is a pointer to the buffer containing the CIN description of the data structure. The parameter cinlen is the size of the CIN. PCU_PREPARE returns a "prepared CIN" that will be stored in the address pointed to by prepbuf. To specify a maximum length for prepbuf, prepbufmaxlen may be set to a particular value. The function also returns prepbuf_len, which specifies the size of the prepared CIN contained in prepbuf. A value of NULL may be passed as this parameter if this value is not required. The actual number of bytes that were read from cinbuf is returned in the parameter *cin_used. NULL may also be used as this parameter if the value of *cin_used is not required.

PCU_PREPARE is used to create a prepared CIN, which is a table of op_tag data structures that describes the data type, offset, size, and alignment of the CIN-described data structure. PCU_PREPARE creates these op_tag structures by initially creating a ctx data structure used to pass context to and from each internal function in PCU_PREPARE. Using a ctx structure is preferred over passing individual parameters to the various internal functions. The ctx structure is defined in C as follows:

```
struct prepare_ctx_tag {
    op_def          *op;
    op_def          *op_table;
    op_def          *op_end;
    const char      *cinptr;
    const char      *cinend;
    long            offset;
    short           align;
    long            size;
    long            nr_unbounded;
    long            nr_anys;
    op_def          *prev_branch;
    op_def          *main_union;
};
```

The fields of the ctx structure are as follows. The op pointer points to the current operation in the prepared CIN. This pointer is incremented as PCU_PREPARE analyzes each CIN item (as described below). The op_end pointer points to the last possible operation in the prepared CIN plus one.

The cinptr pointer points to the next byte to be read from the entire CIN string being prepared. The cinend pointer points to the last byte plus one of the CIN string being prepared. The offset, align, and size fields of this ctx structure are output parameters of process_cin_item (described below) that specify the offset, required alignment, and size of the processed field in the CIN-described data structure. A running count of the number of unbounded sequences and strings encountered in the processed CIN string is contained in the nr_unbounded. A running count of the fields using the IDL "any" data type is contained in the nr_anys field. The field prev_branch points to a union branch operation previously processed. A list of This field is used to build a list of branch operations whose head is contained in the main union operation. The union operation is pointed to by main_union.

Once the ctx structure has been created, PCU_PREPARE calls PROCESS_CIN_ITEM for each character in the CIN string, TAKE_LONG for each signed long integer in the CIN string, and TAKE_ULONG for each unsigned long integer in the CIN string. PROCESS_CIN_ITEM processes a single item in the CIN string. The ctx structure is passed to PROCESS_CIN_ITEM. PROCESS_CIN_ITEM can be implemented in many ways. Preferably, the function uses a C-language "switch" statement containing a "case" for each possible character in a CIN string. In addition, a case statement may be used to recursively call itself to handle complex structures such as a sequence of struct types or a union of unions.

TAKE_LONG and TAKE_ULONG are used in conjunction with particular data types that are followed by numerals (number of array dimensions, etc . . . ). TAKE_LONG extracts a signed long integer from the CIN buffer and returns the value to PCU_PREPARE. TAKE_ULONG extracts an unsigned long integer from the CIN buffer and returns the value to PCU_PREPARE. These values are used by PCU_PREPARE to create the table of op_tag data structures.

For each call, PROCESS_CIN_ITEM modifies the ctx data structure. First, PROCESS_CIN_ITEM increments the op pointer to ensure that the other fields of the structure correspond to the proper CIN item. In addition, the size, align, and offset fields of the ctx structure are changed. The alignment for each data type is determined based upon the following alignment rules. Base data types are aligned to their size. Thus, a short data type has two-byte alignment, a long has a four-byte alignment, etc . . . . Struct types and union types have the same alignment as the contained field with the highest alignment requirement. Nevertheless, struct and union types, preferably, have an alignment requirement of at least two bytes. Finally, struct and union types are preferably padded to a multiple of their alignment requirement.

When each call to PROCESS_CIN_ITEM returns, PCU_PREPARE creates an op_tag data structure based upon the modified ctx structure. An array of these op_tag structures is then stored in the prepared CIN buffer, prepbuf, after calling PCU_PREPARE. The op_tag structure is a linear structure that can easily be manipulated by other functions. The structure, op_tag, is defined as follows:

```
struct op_tag {
    type_def      type;
    long          offset;
    long          align;
    long          size;
```

```
    long          nr_elements;
    long          branch_label;
    char          is_default_branch;
    char          is_simple;
    char          reserve_XXX;
    op_def        *sequence_end;
    op_def        *next_branch;
    op_def        *union_end
    op_def        *default_branch};
```

The type parameter indicates the IDL data type of the data structure. The type_def type definition is an enumeration of all of the possible data types. The offset parameter is the offset of the component data structure from the start of the containing structure or union if the data structure is part of a structure or union. The alignment required by the data type (1, 2, 4, or 8 bytes) is specified by the align parameter. The size parameter indicates the size of the data structure in bytes including rounding. The nr_elements parameter is used for different purposes. For an array, the parameter indicates the total number of elements for all dimensions. For sequences, the parameter indicates the maximum number of occurrences. For strings, the parameter specifies the maximum size excluding zero termination. For structures, it indicates the number of primary fields in the structure. For unions, it indicates the number of fields in the union. The branch_label and is_default_branch parameters are for union branches only. The branch_label parameter contains the case label value that was specified in the IDL specification of the union, while the is_default_branch parameter is true if the entry describes the default union branch. The is_simple parameter is a boolean value that is true if the data structure is of an IDL base data type and is false if the data structure is a compound type. The *next_branch parameter is used for unions and union branches and points to the address of the next branch entry belonging to the union. In the case of a union entry, the parameter points to the first branch. For the last branch, the parameter contains the value NULL. The *union_end parameter points to the address of the next entry following the conclusion of the final branch. The *sequence_end parameter, used for sequences only, points to the address of the next entry following the sequenced type. The *default_branch parameter points to the address of the default branch entry. This is used if none of the branches in the branch list matched the union discriminator. If there is no default, the value of default_branch is NULL. The reserve_XXX parameter allows fields to be added to the op_tag structure without causing errors in existing programs that erroneously assume the size of the prepared CIN.

Figure 5B:
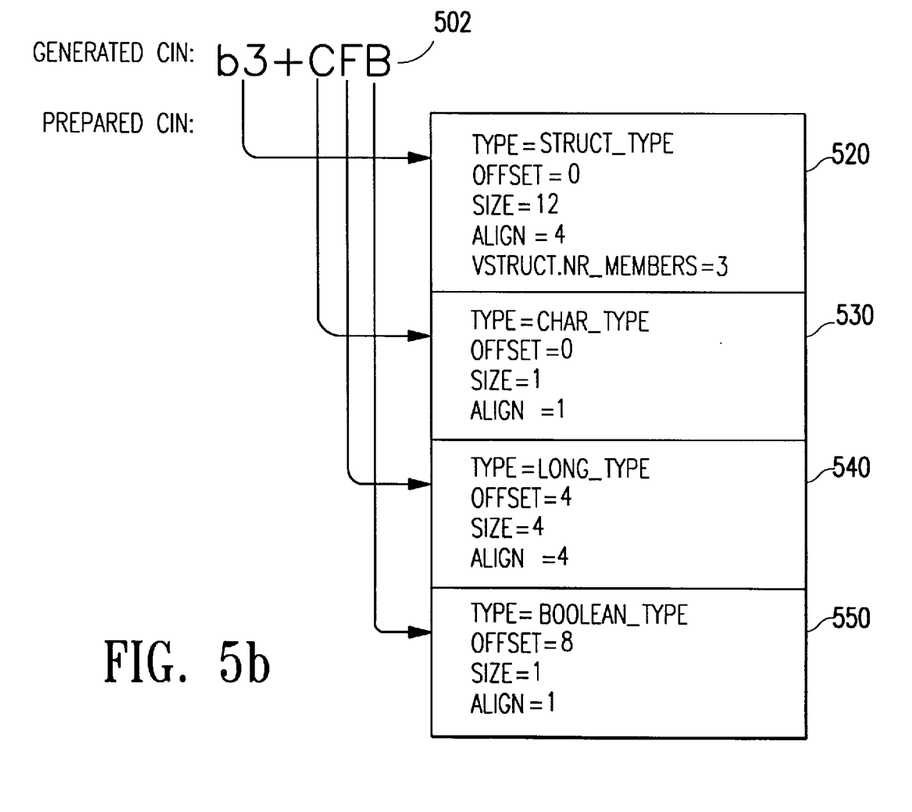

FIG. 5b shows the generated array of op_tag structures for the CIN string 502. The first structure 520 specifies the type, offset, size, alignment, and number of members for the MyStruct structure. The next three op_tag structures 530, 540, 550 contain the type, offset, size, and alignment for each field in the MyStruct structure. This array of structures is stored in a buffer, prepbuf, that will be used by PCU_PACK and PCU_UNPACK to send structured data across a file or to a network.

Once the data structure has been "prepared" and the array of op_tag structures is stored in prepbuf, various messages stored in that data structure can be packed into a buffer and transported using PCU_PACK. PCU_PACK is used to copy a structured data type into an output buffer during transport to a file or across the network. PCU_PACK supports all IDL constructs including unions, unbounded sequences/strings and "any" types.

PCU_PACK stores the components of a structured data type into an output buffer based upon a specified format. PCU_PACK is defined in C as follows:

```
PCU_PACK (
    char        dst_integer_fmt,
    char        dst_real_fmt,
    char        dst_char_fmt,
    const void  *prepbuf;
    const void  *inbuf;
    long        outbuf_max_len,
    void        *outbuf,
    long        *outbuf_len);
```

The first three parameters specify how data is to be packed into the output buffer. These parameters may be caller-defined functions for performing the conversion as provided by the caller. The first parameter, dst_integer_fmt, specifies the format to be used for short, long and long data types in the output buffer. Examples of possible values for this format are PCU_INTEGER_BIGENDIAN which specifies an integer representation where the byte significance decreases with increasing address or PCU_INTEGER_LITTLEENDIAN which specifies an integer representation where the byte significance increases with increasing address. The parameter dst_real_fmt specifies the format to be used for float and double data types in the output buffer. Sample values for this parameter are PCU_REAL_IEEE which specifies a floating point number representation using the standard IEEE format or a vendor-specific value, such as PCU_REAL_T16 which specifies a floating point number representation using the TANDEM T16 format, for example. The third parameter, dst_char_fmt specifies the format to be used for char and string types in the output buffer. One possible value for this parameter is a character representation using the ISO Latin-1 format, a super-set of ASCII. Anther possible value is EBCDIC, which permits compatibility with IBM™ hosts.

The *prepbuf parameter, as stated above, is a pointer to the address containing the prepared CIN description as returned by PCU_PREPARE. The *inbuf parameter is a pointer to the address of the structured data to be stored into the output buffer. The *outbuf parameter is a pointer to the address of the output buffer that receives the actual packed data. The maximum number of bytes that can be accommodated by outbuf is contained in the outbuf_max len parameter. The number of bytes actually written to outbuf is returned by the outbuf_len parameter. A value of NULL may be passed as this parameter if the number of bytes is not needed. If PCU_SHORTOUTBUF is returned by the function, then the outbuf_len parameter gets the required outbuf size.

Accordingly, to dynamically allocate memory for the output buffer, the client application can call PCU_PACK twice. On the first call, outbuf_max_len is set to zero. PCU_PACK will then return PCU_SHORTBUF and outbuf_len will contain the required output buffer size. The correct amount of memory for the output buffer can then be allocated prior to calling PCU_PACK for a second time.

PCU_PACK initially creates a ctx structure. This ctx structure provides a similar function as the context structured used by PROCESS_CIN_ITEM. The structure allows large amounts of context to be shared between PCU_PACK and the lower-level routines that are called by PCU_PACK_ENGINE. This ctx structure is used by the underlying functions to PCU_PACK and is defined as follows:

```
struct pack_ctx_tag {
    char    dst_integer_fmt,
    char    dst_real_fmt,
    char    dst_char_fmt,
    char    *outptr,
    char    *outbuf_end
}
```

The requested destination format as specified in the call to PCU_PACK are passed to the ctx structure. These three fields are needed in case PCU_PACK must be called recursively to handle an IDL "any" type. The outptr pointer points to the next byte to be written into the output buffer. Even if the output buffer is full, the pointer continues to be updated. This allows the correct size to be returned to the caller in case of overflow. The caller can then adjust the size of the output buffer. The pointer outbuf_end points to the last byte plus one in the output buffer.

PCU_PACK calls an internal function, PCU_PACK_ENGINE. PCU_PACK_ENGINE receives pointers to lower-level functions that perform the actual packing of data into the output buffer. PCU_PACK also receives a pointer to prepbuf, a pointer to the data to be packed (contained in inbuf), and a pointer to the ctx structure created by PCU_PACK. PCU_PACK_ENGINE goes element-by-element through the prepbuf buffer and calls the appropriate lower-level function for the element based upon the type of the element (as specified by the type contained in the op_tag structure) and based upon the dst_XXX_fmt parameter to PCU_PACK. PCU_PACK_ENGINE provides the address to the input buffer containing the structured data, the data type (via a CIN character), the ctx structure address, and the size of the data in the input buffer to pack into the output buffer (as specified by the size field of the op_tag structure).

PCU_PACK_ENGINE calls the appropriate lower-level function based upon the type of data contained in the op_tag data structure and the conversion specified on the call to PCU_PACK. The lower-level functions are known, lower-level functions that pack data either transparently or perform some specified conversion (BIGendian to LITTLEendian, e.g.). Each caller-supplied function takes data from the input buffer and places it into an output buffer. The number of bytes to be taken from the input buffer is specified by the size parameter provided to the function from PCU_PACK_ENGINE. Once the data has been placed in the output buffer, the lower-level function modifies the outptr parameter of the ctx structure to point to the byte following the last byte written to the output buffer.

PCU_PACK_ENGINE uses the various lower-level functions to store data in the output buffer as follows. The structured data types in the input buffer are stored densely (byte-aligned) in the output buffer in the same order as they were originally defined in IDL. The contents of any padding fields inserted by the code generator to achieve correct alignment are discarded. Similarly, the functions do not place default values in those fields.

Base type data structures are stored in the output buffer in the representation specified by the dst_XXX_fmt parameters on the call to PCU_PACK. Typically, these parameters are set to the packer's native format without any conversion. Thus, the server application (the unpacker) would perform the actual conversion. The routines utilized in the present invention, however, permit the packer to perform a conversion of the data structures as well.

The representation of shorts, unsigned shorts, longs, unsigned longs, long longs, and unsigned long longs are specified in the dst_real_fmt parameter to PCU_PACK.

This parameter specifies the format for representing floating point numbers. The alignment of floats and doubles are specified by the dst_real_fmt parameter. This parameter corresponds to the format for representing integers. The representation of chars are specified by the dst_char_fmt parameter. The dst_char_fmt parameter specifies a format for representing characters. Booleans and octets are not realigned. The "any" type is stored as an unsigned long specifying the length of the CIN description (whose alignment is based upon the dst_integer_fmt parameter), a CIN string describing the type (an unconverted ASCII string), and the data itself (stored based upon these conversion rules).

Compound types such as arrays and unions are also realigned. Arrays are stored with no padding between elements. Sequences are stored as unsigned long integers indicating the number of occurrences followed by that number of occurrences. Any padding between occurrences is removed. The format of the long integers depends upon the dst_integer_fmt parameter as stated above. A string is stored as an unsigned long indicating the length of the string followed by that particular number of characters stored as chars. The format of the chars is determined by the dst_char_fmt parameter. Structures are stored field by field without padding. Unions are stored as a long followed by the active union branch.

On the receiving end, the server application must extract the unstructured data type and its appendages from the buffer that was packed using PCU_PACK. PCU_UNPACK then places this unstructured data into a data structure based upon the prepared CIN for the data structure. PCU_UNPACK is defined as follows:

```
PCU_UNPACK (
    char             src_integer_fmt,
    char             src_real_fmt
    char             src_char_fmt
    const void           *prepbuf,
    const void           *inbuf,
    long             inbuf_len
    long             outbuf_max_len,
    void             *outbuf,
    long             *outbuf_len
    long             *inbuf_used);
```

The first three parameters correspond to the first three parameters of PCU_UNPACK. These parameters specify the format of data types as stored in the input buffer. These parameters are preferably identical to their PCU_PACK counterparts. The *prepbuf parameter is a pointer to the address containing the prepared CIN description as returned by PCU_PREPARE. The address of the input buffer is pointed to by *inbuf. The length of inbuf is specified by inbuf_len. The address of the output buffer is pointed to by *outbuf. The maximum number of bytes that can be accommodated by outbuf is specified by outbuf_max_len. The parameter *outbuf_len obtains the number of bytes actually written to outbuf. The number of bytes read from the input buffer is specified by *inbuf_used. If the number of written bytes or the number of read bytes are not needed, NULL may be passed as the value for these parameters.

PCU_UNPACK creates a ctx structure that is used to pass context around to the internal functions of PCU_PACK. This ctx structure is used by the underlying functions to PCU_UNPACK and is defined as follows:

```
struct pack_ctx_tag {
    char             src_integer_fmt,
    char             src_real_fmt,
    char             src_char_fmt,
    char             *inptr,
    char             *inbuf_end
}
```

The first three parameters are the formats passed to PCU_UNPACK. These parameters are needed by the internal functions in case PCU_PACK is called recursively to handle an IDL "any" type. The inptr pointer points to the next byte to be read from the input buffer. The inbuf_end pointer points to the last byte plus one in the input buffer.

After creating the context structure, PCU_UNPACK calls PCU_UNPACK_ENGINE which provides the functionality for PCU_UNPACK. PCU_UNPACK_ENGINE receives pointers to caller-supplied function for extracting data from the input buffer (the output buffer provided by PCU_PACK) and placing it in an output buffer. The prepared CIN buffer is also provided as a parameter. PCU_UNPACK_ENGINE goes element-by-element through the prepared CIN and stores the data into a data structure as specified by the offset and size fields of the op_tag structures.

For each element in the prepared CIN buffer, PCU_UNPACK_ENGINE calls the appropriate lower-level user-specified function to perform the unpacking and converting. PCU_PACK_ENGINE passes the data type and size of the data to be read from the input buffer along with the address of the output buffer to write the data. PCU_UNPACK_ENGINE also passes the ctx data structure to each of the functions. Each caller-specified function then extracts the data from the input buffer and places the data into a data structure. The number of bytes to be written from the input buffer to the output buffer is determined by the size parameter. For compound types, PCU_UNPACK_ENGINE provides additional parameters to the caller-supplied functions. If the data structure is an array, the number of elements in the array is provided. If the data structure is a sequence, PCU_UNPACK_ENGINE provides the maximum number of elements in the sequence along with the actual number of elements. If the data structure is a string, the maximum size and actual size of the string are provided to the caller-supplied functions. If the compound type is a struct data type, the number of members of the structure are provided.

Figure 6:
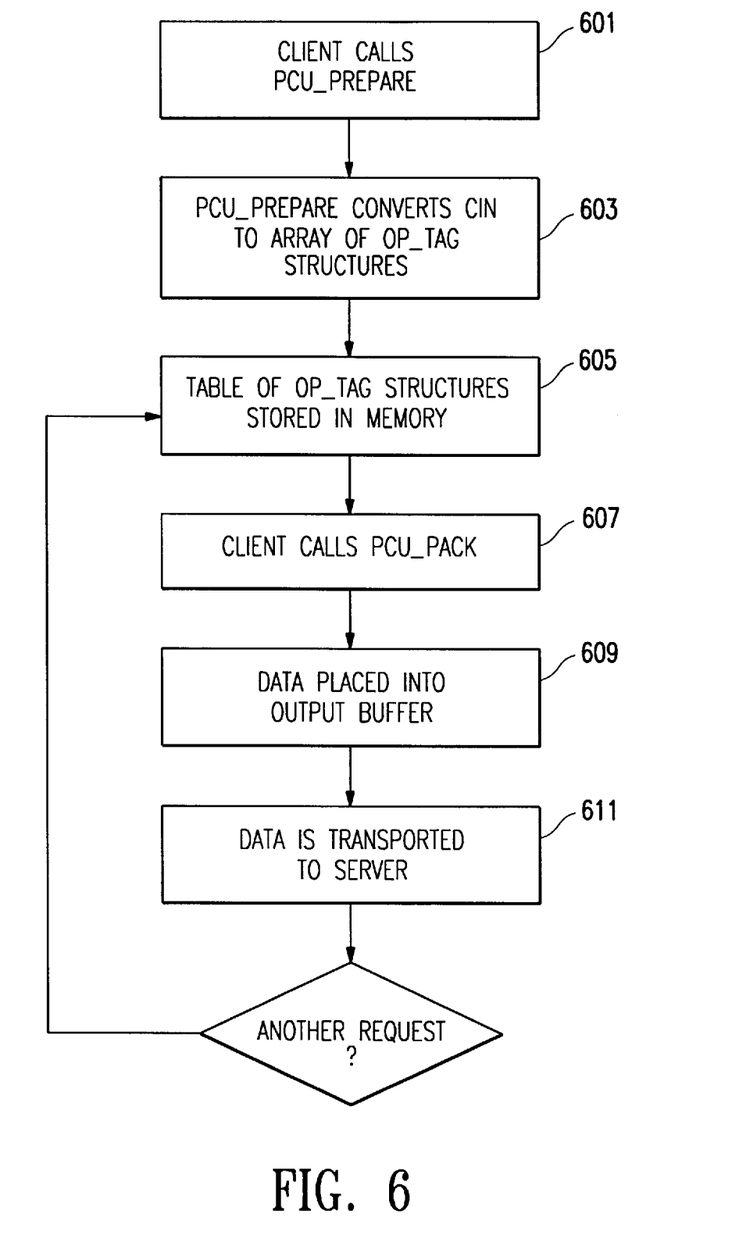
FIG. 6 is a flow chart describing a first preferred embodiment of the client side of the method of the present invention.

Now, with reference to FIGS. 6 and 7, the method of the present invention will be described. FIG. 6 is a flow chart of the client side of the method of the present invention. Prior to performing the method of the present invention, as stated above, compact descriptions of data structures are created by the code generator 111 and are included in the client and server stubs. This description can be created using the method described in Application No. XXX. The client and server stubs are compiled and linked into the client and server applications. Once the client stubs have been linked into the client application, in a first step 601, the client application creates a prepared CIN description by calling the function PCU_PREPARE. PCU_PREPARE takes the CIN description of the data structure and, in step 603, converts the CIN to an array of op_tag data structures by calling PROCESS_CIN_ITEM for each element of the CIN description. Each structure contains information regarding the type, offset, alignment, and size of the CIN-described data structure. A table of these structures are then stored in a memory buffer called prepbuf, in step 605.

In step 607, the client application calls PCU_PACK which packs the data structure by copying the data into an output buffer based upon the size as specified by the size field of each op_tag. PCU_PACK removes any alignment padding fields from the data structure and places the data structure, in step 609, into an output buffer. Once the data structure has been packed into the output buffer, the data is transported in step 611. The data structure may be transported across a wire to a server application or transported to a file, such as a disk file. If another request involving the same data structure is made, this request is packed and the client application repeats steps 605–611 for the new request. The CIN description of the data structure need not be "prepared" again.

Figure 7:
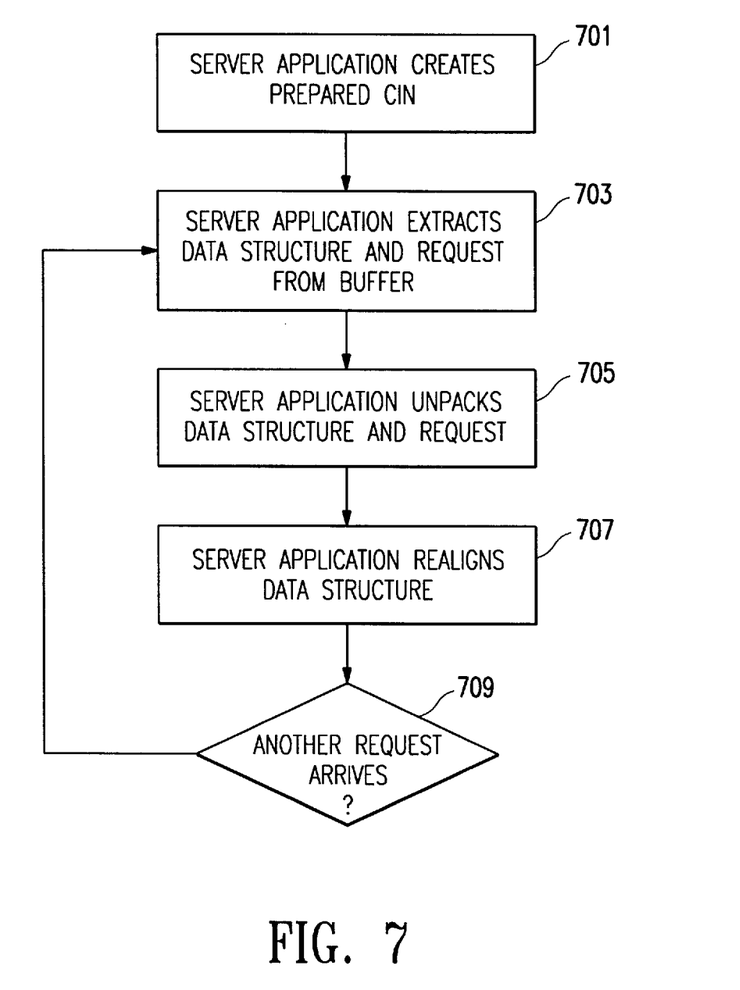
FIG. 7 is a flow chart describing a first preferred embodiment of the server side of the method of the present invention.

FIG. 7 shows the server side of the method of the present invention. The server application, in step 701, calls PCU_PREPARE to obtain a prepared description of the CIN. The "prepare" step is similar to step 601 described above. The server then calls PCU_UNPACK in step 703 to extract a structured data type and all of its appendages from the buffer that was packed using PCU_PACK. In step 705, the structure is unpacked based upon the parameters passed to the function (the same parameters passed to the PCU_PACK function). While extracting the data structure, the structure is realigned in step 707 from the format specified in the input buffer of the server to the native alignment of the server. If another request arrives at the server, the server can call PCU_UNPACK to unpack the request without preparing the data structure.

Having thus described a preferred embodiment of a method and apparatus for converting IDL-defined data structures to and from a format convenient for transport, it should be apparent to those skilled in the art that certain advantages of the within system have been achieved. It should also be appreciated that various modifications, adaptations, and alternative embodiments thereof may be made within the scope and spirit of the present invention. For example, IDL-defined data structures have been illustrated, but it should be apparent that the inventive concepts described above would be equally applicable to hand-written data structures if the structures follow the same alignment rules as the code generators. The invention is further defined by the following claims.

What is claimed is:

1. A method for transporting a data structure from a host computer to a client computer, the data structure having at least one field, the method comprising the steps of:

generating, by the host computer, a string description of the data structure;

generating, by the host computer, a host description of the string description, the host description describing the size, alignment, and type of each field in the data structure as used within the host computer;

generating, by the client computer, a client description of the string description, the client description describing the size, alignment, and type of each field in the data structure as used within the client computer;

packing, by the host computer, the data structure in an output buffer of the host computer based upon the description in the host description; and transporting, by the host computer, the output buffer to an input buffer of the client computer.

2. A method for transporting a data structure, as recited in claim 1, further comprising the step, performed by the client computer, of:

generating a second data structure using the input buffer and the client description.

3. A method for transporting a data structure, as recited in claim 2, wherein the step of packing by the host computer further comprises the steps, performed by the host computer, of:

storing floating point and double type components of the data structure in a format for representing floating point numbers;

storing long, long long, unsigned long, unsigned long long, short, and unsigned short type components of the data structure in a format for representing integers; and storing character type components of the data structure in a format for representing characters.

4. A method for transporting a data structure, as recited in claim 2, wherein the step of packing by the host computer comprises the steps, performed by the host computer, of:

converting "any" type components of the data structure to an unsigned long that specifies a length of the string description, the string description, and components of the "any" data structure;

storing the unsigned long in the format for representing integers;

storing the string as an unsigned long indicating the length of the string followed by a plurality of characters;

storing each of the plurality of characters in the format for representing characters; and storing each component of the "any" data structure according to a predetermined format.

5. A method for transporting a data structure, as recited in claim 2, wherein the step of packing by the host computer further comprises the steps, performed by the host computer, of:

storing elements of an array component of the data structure in an unpadded format;

storing a sequence component of the data structure in the format for representing integers;

converting a string component of the data structure to an unsigned long type indicating a length of the string, followed by a plurality of characters;

storing the unsigned long representing the string component of the data structure in the format for representing integers; and storing each of the plurality of characters in the format for representing characters.

6. A method for transporting a data structure, as recited in claim 2, wherein the format for storing floating point numbers is IEEE format.

7. A method for transporting a data structure, as recited in claim 2, wherein the format for storing floating point numbers is TANDEM T16 format.

8. A method for transporting a data structure, as recited in claim 2, wherein the format for storing integers specifies that byte significance of an integer decreases with increasing address.

9. A method for transporting a data structure, as recited in claim 2, wherein the format for storing integers specifies that byte significance of an integer increases with increasing address.

10. A method for transporting a data structure, as recited in claim 2, wherein the format for storing characters is ISO Latin-1.

11. A computer program product comprising:

a computer usable medium having computer readable code embodied therein for transporting a data structure from a host computer to a client computer, the computer program product comprising:

first computer readable program code devices configured to cause the host computer system to generate a string description of the data structure;

second computer readable program code devices configured to cause the host computer system to generate a host description, the host description describing the size, alignment, and type of each field in the data structure as used within the host computer;

third computer readable program code devices configured to cause the client computer system to generate a client description, the client description describing the size, alignment, and type of each field in the data structure as used within the client computer;

fourth computer readable program code devices configured to cause the host computer system to pack the data structure in an output buffer of the host computer based upon the description in the host description; and fifth computer readable program code devices configured to cause the host computer system to transport the output buffer to an input buffer of the client computer.

12. A computer program product, as recited in claim 11, further comprising:

sixth computer readable program code devices configured to cause the client computer system to generate a second data structure using the input buffer and the client description.

13. A computer program product, as recited in claim 12, wherein the fourth computer readable program code devices are further configured to cause the host computer to:

store floating point and double type components of the data structure in a format for representing floating point numbers;

store long, long long, unsigned long, unsigned long long, short, and unsigned short type components of the data structure in a format for representing integers; and store character type components of the data structure in a format for representing characters.

14. A computer program product, as recited in claim 12, wherein the fourth computer readable program code devices are further configured to cause the host computer to:

convert "any" type components of the data structure to an unsigned long that specifies a length of the string description, the string description, and components of the "any" data structure;

store the unsigned long in the format for representing integers;

store the string as an unsigned long indicating the length of the string followed by a plurality of characters;

store each of the plurality of characters in the format for representing characters; and store each component of the "any" data structure according to a predetermined format.

15. A computer program product, as recited in claim 12, wherein the fourth computer readable program code devices are further configured to cause the host computer to:

store elements of an array component of the data structure in an unpadded format;

store a sequence component of the data structure in the format for representing integers;

convert a string component of the data structure to an unsigned long type indicating a length of the string, followed by a plurality of characters;

store the unsigned long representing the string component of the data structure in the format for representing integers; and store each of the plurality of characters in the format for representing characters.

16. A computer program product, as recited in claim 12, wherein the format for storing floating point numbers is IEEE format.

17. A computer program product, as recited in claim 12, wherein the format for storing floating point numbers is TANDEM T16 format.

18. A computer program product, as recited in claim 12, wherein the format for storing integers specifies that byte significance of an integer decreases with increasing address.

19. A computer program product, as recited in claim 12, wherein the format for storing integers specifies that byte significance of an integer increases with increasing address.

20. A computer program product, as recited in claim 12, wherein the format for storing characters is ISO Latin-1.

21. A system for transporting a data structure from a host computer to a client computer, the system comprising:

means within the host computer system for generating a string description of the data structure;

means within the host computer system for generating a host description, the host description describing the size, alignment, and type of each field in the data structure as used within the host computer;

means within the client computer system for generating a client description, the client description describing the size, alignment, and type of each field in the data structure as used within the client computer;

means within the host computer system for packing the data structure in an output buffer of the host computer based upon the description in the host description; and means within the host computer system for transporting the output buffer to an input buffer of the client computer.

22. A system for transporting a data structure, as recited in claim 21, further comprising:

means within the client computer system for generating a second data structure using the input buffer and the client description.

23. A system for transporting a data structure, as recited in claim 22, wherein the means within the host computer system for packing the data structure are further configured to:

store floating point and double type components of the data structure in a format for representing floating point numbers;

store long, long long, unsigned long, unsigned long long, short, and unsigned short type components of the data structure in a format for representing integers; and store character type components of the data structure in a format for representing characters.

24. A system for transporting a data structure, as recited in claim 22, wherein the means within the host computer system for packing the data structure are further configured to:

convert "any" type components of the data structure to an unsigned long that specifies a length of the string description, the string description, and components of the "any" data structure;

store the unsigned long in the format for representing integers;

store the string as an unsigned long indicating the length of the string followed by a plurality of characters;

store each of the plurality of characters in the format for representing characters; and store each component of the "any" data structure according to a predetermined format.

25. A system for transporting a data structure, as recited in claim 22, wherein the means within the host computer system for packing the data structure are further configured to:

store elements of an array component of the data structure in an unpadded format;

store a sequence component of the data structure in the format for representing integers;

convert a string component of the data structure to an unsigned long type indicating a length of the string, followed by a plurality of characters;

store the unsigned long representing the string component of the data structure in the format for representing integers; and store each of the plurality of characters in the format for representing characters.

26. A system for transporting a data structure, as recited in claim 22, wherein the format for storing floating point numbers is IEEE format.

27. A system for transporting a data structure, as recited in claim 22, wherein the format for storing floating point numbers is TANDEM T16 format.

28. A system for transporting a data structure, as recited in claim 22, wherein the format for storing integers specifies that byte significance of an integer decreases with increasing address.

29. A system for transporting a data structure, as recited in claim 22, wherein the format for storing integers specifies that byte significance of an integer increases with increasing address.

30. A system for transporting a data structure, as recited in claim 22, wherein the format for storing characters is ISO Latin-1.

* * * * *